Nov. 9, 1954
C. L. BECKHAM
2,693,912
APPARATUS FOR MEASURING USAGE OF EQUIPMENT
Filed Jan. 25, 1952
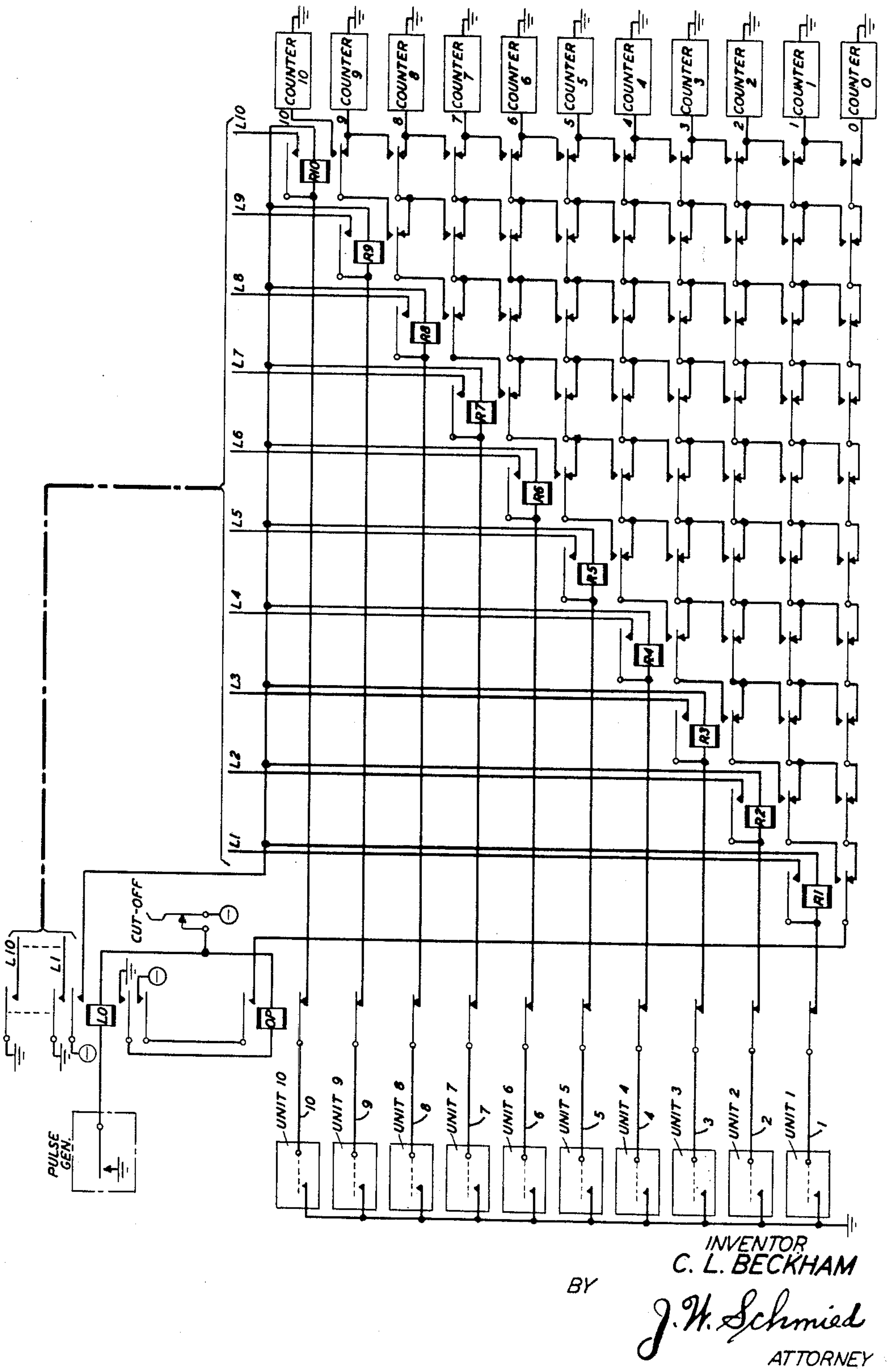
INVENTOR
C. L. BECKHAM
BY
J. W. Schmied
ATTORNEY 2,693,912

APPARATUS FOR MEASURING USAGE OF EQUIPMENT

Claud L. Beckham, Flushing, N. Y., assignor to Bell Telephone Laboratories, Incorporated, New York, N. Y., a corporation of New York Application January 25, 1952, Serial No. 268,245

7 Claims. (Cl. 235—92)

This invention relates generally to statistical apparatus and more particularly to an arrangement of statistical apparatus useful for deriving data relevant to the occupancy of a plurality of units.

The invention has for its main object the improvement of statistical systems useful in deriving data relevant to the average occupancy of a plurality of units over a period of time.

Another object of the invention is to increase the reliability and simplicity of such statistical systems.

A feature of the invention is the use of a symmetrical circuit as a statistical distributing means.

A preferred exemplary embodiment of the invention is shown in the accompanying drawing which represents a circuit of a preferred exemplary embodiment of the system.

In modern business organizations continuous effort, time, and money, are expended in attempting to maintain the average occupancy of equipment which they possess at a high level. In other words, business organizations constantly strive to keep the idle time of their equipment at a minimum. It is well known in the business world that idle machinery or equipment can make no money for the owner. Thus, in a machine shop it would be the constant aim of the owner to run all of his machines as close to 100 per cent of the working period as is practicable. Similarly, in a printing shop it would be the constant aim of the person in charge to have all the printing presses running 100 per cent of the working period. Likewise, in the telephone industry, it is desirable to maintain the usage of the equipment at as high a rate as is possible consistent with economy.

Statistical problems encountered in the telephone industry may be taken as exemplary for the purpose of this discussion. In the telephone industry it is a constant aim of the telephone companies to provide optimum service consistent with economy of operation. In view of this goal, frequent studies are made to determine the average use or occupancy of the various equipment used in telephone systems. The ideal theoretical goal concerning the usage of any equipment obviously is 100 per cent; however, it is obvious that in practice no such goal could be attained. The reasons the ideal goal of 100 per cent can never be attained in the telephone field is because the usage of telephone equipment does not stay at a constant value through the day, but fluctuates from maximum demand during business hours to minimum levels during the early morning hours. It would be economically unwise to equip a telephone office with such a scarce amount of equipment that 100 per cent of the equipment would be utilized all the time. The reason for this is that if all the equipment were utilized 100 per cent of the time, the capacity of the system would be limited to the rate of usage that occurs during the periods of minimum use such as in the early morning hours after midnight. With such an arrangement the system would be subjected to great overloads during the periods of maximum use, and therefore many people would be unable to place their calls promptly.

It would also be just as uneconomical to provide such a vast amount of telephone equipment that all of it would be utilized only during the time of some theoretically possible but actually improbable peak load, such as would result if every person owning a telephone should attempt to place a call at the same instant. Obviously, the most economical point of operation of any telephone system is to have the average occupancy or use of the equipment as near the 100 per cent level as is practicable only during the time of any peak that may be reasonably expected to occur. The goal of 100 per cent can never be attained since it is always the practice of the telephone industry to provide a small margin of reserve equipment in order to provide for any unexpected emergency. In line with these objectives it is imperative that management be constantly informed as to the average occupancy of the equipment which is already in service, so that additional equipment may be ordered when it appears that the present quantity of equipment will no longer give satisfactory results.

The equipment used in the past to perform such studies and to furnish suitable data has not been wholly satisfactory. The prior art equipment has been too complex, too bulky, and has in general failed to supply the data desired for such purposes.

An obvious method of deriving such data, and one that has been used in the past, is to attach a time recording device to each unit or machine that is to be used, and then at the end of each interval of time in question the percentage of busy time and the frequency distribution can be computed from the data taken from the recording machines. The disadvantage with this method is that the compilation of the data taken from the recording machines into the type of statistics desired for this study is a laborious process.

Another method used in the prior art to obtain data of the type desired has been to employ a device that sequentially scans all of the units or machines employed and records a busy or idle condition for each unit. This method has the disadvantage that it does not allow a simultaneous comparison of all units or machines at any one instant of time. It also has the disadvantage that it usually requires moving parts which are subject to wear and misadjustment.

Another method used in the prior art involves the use of a resistive network and an ammeter. The resistance of the resistive network is caused to vary in accordance with the per cent of occupancy of the group of units or machines, and as the resistance varies, the current through the ammeter can be observed and recorded. The current at any one time will obviously be representative of the number of units or machines busy at that same instant of time. This method of deriving data is difficult to use in situations where the busy time of the equipment may be of the order of one or two seconds.

The method utilized by the present invention is preferable over those described above in that a minimum of moving parts is utilized, the equipment is not complex, and the equipment is suitable for use in situations where the busy time of the units or machines may be in the order of only one or two seconds, such as would occur in the telephone industry.

Another advantage of the present invention is that it furnishes complete and correlated data, whereas the methods mentioned above merely furnish raw data to the observer. The output data of the present device is in terms of frequency distribution which indicates how many units or machines were found busy at how many instances of time for the time interval in question. Once this data is obtained the average occupancy and other statistical parameters for the period under study can be determined by means of a few simple calculations. The ammeter and time recorder methods mentioned above merely furnish raw data to the observer.

The present invention was developed to aid in the furtherance of these objectives as mentioned above, and provides a simple and convenient means of deriving data relevant to the average occupancy of a plurality of units over a given period of time.

A complete description of the invention will now be given with reference to the accompanying drawing, on which the devices or machines whose occupancy it is desired to check are, for the lack of a better term, designated "units." This generic term "units" could represent punch presses in a machine shop, it could represent printing presses in a printing shop, it could represent any desired pieces of telephone equipment in a telephone system, and it could represent any device whose occupancy or use the owner thereof desired to check.

In the drawing ten units are shown. It can readily be appreciated that this figure is merely exemplary and that any desired number of units could be utilized without departing from the spirit and scope of the present invention. Inside of each square representative of a unit on the drawing, is shown a pair of dotted contacts, one contact of which is a ground connection. From this other contact a wire is shown leading to a separate contact on the OP relay. This dotted ground connection with its associated relay contacts symbolically represents the fact that each unit when in operation, in use, or when occupied, will close the contacts shown inside the square, and place a ground potential on the wire leading to the associated contact on the OP relay. The closing of these contacts could be effected by some device that will be actuated in response to the operation of the machine, such as a relay, a microswitch, or any other means deemed suitable for the purpose.

The wires running from each unit to the appropriate contact on the OP relay are designated 1 through 10, inclusive. The leads 1 through 10, after going through the contacts of the OP relay, when unoperated, are connected to the windings of the relays designated R1 through R10, respectively. It can be readily appreciated that the number of "R relays" is not limited to ten as shown on the drawing, but may be of any number as is consistent with the number of units or machines whose occupancy it is desired to check. The contacts of the R relays are connected so as to form a network of the type commonly designated "a symmetrical circuit." The lower movable contact of relay R1, as shown in the drawing, is usually designated the input of the symmetrical circuit, while the lower stationary contacts of relay R10, as shown in the drawing, is usually designated the output of the symmetrical circuit.

The contacts on the output of the symmetrical circuit are designated 0 through 10, respectively, and each is connected to an electrical counter which bears the same numerical designation as does the contact. These electrical counters may be of any type deemed suitable for the purpose, such as electrically operated magnetic ratchet-type counters, or electronic vacuum tube impulse counters.

Each of relays R1 through R10 is connected to a locking circuit by means of its upper contacts to ground over wires L1 through L10, respectively, and through a pair of correspondingly designated contacts on relay LO operated. The right winding terminals of relays R1 through R10 are wired together and connected to a contact on the LO relay which, when operated, furnishes a negative battery to the above-mentioned circuit. The left winding terminals of the R relays are connected, by means of the wires designated 1 to 10, to the correspondingly designated units through the contacts of the OP relay.

Apparatus designated "pulse generator" is connected to the left winding terminal of the LO relay. The pulse generator is merely shown in a diagrammatic fashion as it may be of any type deemed suitable for the purpose, such as an arrangement of the relay pulsing type, of the rotary cam and pulsing contact type, or of the electronic multivibrator type. The only requirement for the pulse generator is that it supply a ground pulse to the winding of the LO relay at evenly spaced, timed intervals. As the pulse generator commences operation and furnishes timed ground pulses to the LO relay, the LO relay will respond to these pulses and commence an intermittent operation the frequency of which will be determined by, and will be identical with, the frequency of the pulses supplied by the pulse generator.

The LO relay, when operated, will apply negative battery potential to the right winding terminal of the R relays. When a negative battery potential is applied to the right winding terminal of the R relays, those R relays will operate which now have a ground on their left winding terminal, which ground is furnished at this time by the operation of the various units designated 1 through 10. Thus, it may be seen that the operation of any R relay at this time will be indicative of the fact that the corresponding unit is in use or busy at this time. Any and all R relays that operate at this time will be held operated over their locking contacts. A short time after LO relay operates, relay OP operates over an obvious circuit. The operation of the OP relay removes the ground from the R relays furnished by their correspondingly designed units. However, these relays are held operated, as stated before, by means of a locking ground furnished by the LO relay.

The operation of the OP relay furnishes a negative battery potential to the input contact of the symmetrical circuit. The characteristics of this symmetrical circuit are such that when any input is applied to this circuit this same input will be applied to the output lead which is representative of the number of R relays that are operated at the time the input was applied to the circuit. Since the number of R relays operated is equal to, and representative of the number of units occupied during the specific time that the pulse operated to the LO relay, we have a convenient method of determining how many units were occupied or busy at any one instant. The potential applied to the input contact on the symmetrical circuit will cause the operation of the counter connected to the output contact which is representative of the number of R relays operated, and thus representative of the number of units occupied or busy. For example, if at the time the potential is applied to the input contact of the symmetrical circuit, five units have been occupied, five R relays would be operated, and the symmetrical circuit would effect the operation of the counter designated 5.

When the output pulse from the pulse generator ceases, relays LO and OP release and restore the entire circuit to normalcy.

If at the time the next pulse is sent from the pulse generator three units are occupied or busy, the symmetrical circuit will cause the operation of the counter designated 3.

Thus, as each pulse is sent from the pulse generator, it will effect the operation of the counter which is representative of the number of units that were busy at the specific period of time during which the pulse was sent from the pulse generator.

The count setting on each counter at the end of any designated period of time, such as one hour or one day, will represent the number of times during that interval that the corresponding number of units or machines were found busy by the test pulses. Once the setting on each counter at the end of the period is ascertained, the average occupancy of the entire group of units for that period may be readily ascertained by the use of a known type of easily applied statistical computations.

In practice, the frequency of a pulse generator would be adjusted to suit the needs and desires of the purpose for which it is to be used. In some businesses it may be desired to have the whole system operate and make recordings every half second, while in other businesses it may be sufficient that the whole system operate and make recordings once every minute or even once every five minutes. The present invention can meet this wide range in business requirements by merely adjusting or varying the frequency of the pulse generator. It will be appreciated, of course, that the greater the number of samples or greater the number of times that the system operates during any designated interval of time, the greater will be the accuracy of the entire computation.

A cut-off switch is furnished in series with the negative battery potential applied to one winding terminal of the OP relay so as to furnish a means of halting the operations of the symmetrical circuit when further readings are no longer desired.

It is to be understood that the above-described arrangements are but illustrative of the application of the principles of the invention. Numerous other arrangements may be devised by those skilled in the art without departing from the spirit and scope of the invention.

What is claimed is:

1. In apparatus for deriving data relevant to the average occupancy of a plurality of units over an arbitrary period of time, a plurality of units, a timed pulsing means, a plurality of relay means, each of said relay means corresponding to a selected one of said units and operated by the operation of said corresponding unit, a plurality of counting means, each of said counting means arranged to represent the number of units operable at any one instant of time, a plurality of electrical paths between said timed pulsing means and said plurality of counting means, switching means operated by said relay means to selectively establish a particular path of said plurality of paths from said timed pulsing means to a selected one of said counting means representative of the number of units currently operated, means controlled by said timed pulsing means to operate said selected one of said counting means in response to the establishment of said particular path, and means including said timed pulsing means for operating at predetermined intervals during said arbitrary period of time the selected one of said counting means representative of the number of units operated at the end of each of said intervals.

2. In apparatus for deriving data relevant to the average occupancy of a plurality of units over an arbitrary period of time, a timed pulsing means, a plurality of units, a plurality of relay means each individual to one of said units and each jointly operable in response to the operation of its associated unit and to the reception of a pulse from said timed pulsing means, a plurality of counting means, a plurality of paths from said timed pulsing means to said plurality of counting means, selecting means operated by said plurality of relay means to selectively establish a particular operating path of said plurality of paths from said timed pulsing means to a selected one of said counting means that represents the number of units busy when said timed pulsing means operates, said selected one of said counting means being operated by said timed pulsing means over said selected particular path, and means including said timed pulsing means for repeating at predetermined intervals during said arbitrary period of time the operation of said relay means associated with operated units to accumulate on each of said counting means the number of times the number of units represented by each of said counting means were in an operated condition at the end of each of said intervals during said arbitrary period of time.

3. In apparatus for deriving data relevant to the average occupancy of a plurality of units over a period of time, a cyclically operable pulse generator, a plurality of units whose average occupancy over a period of time it is desired to determine, a plurality of relay means, each of said relay means being associated with one of said units, means operable by the occupancy of each of said units to apply a potential of one polarity to its associated relay means, control means operable in response to the operation of said pulse generator for applying a potential of opposite polarity to all of said relay means to operate each of said relay means associated with an occupied unit, a plurality of counting means, a plurality of connecting paths from said control means to said plurality of counting means, each of said counting means being connected to one of said paths, switching means operated by said relay means to selectively establish a particular path of said plurality of paths from said control means to a selected one of said counting means that represent the number of units busy when said relay means is operated, the selection of said particular path being controlled by the number of relay means of said plurality of relay means operated by said control means when operated by said pulse generator, said selected one of said counting means being operated by said control means over said selectively established particular path, and means including said pulse generator for cyclically repeating at predetermined intervals during said period of time the operation of said control means to accumulate on each of said counting means the number of times the number of units represented by each of said counting means were occupied at each said cyclically repeated operation of said control means.

4. In apparatus for deriving data relevant to the average occupancy of a plurality of units over a period of time, a plurality of units, means for generating pulses at predetermined intervals of time, a first relay means operable in response to pulses generated by said pulsing means, a second relay means operable in response to the operation of said first relay means, a group of relay means wherein each relay of said group is associated with one of said units, means operable by each of said units when busy to place one potential on the winding of its associated relay in said group of relay means, means operable by said first relay means when operated to place a potential of opposite polarity on the relay windings of all relays in said group of relay means to operate the relays in said group of relay means which are associated with busy units, a plurality of counting means each of which represents the number of units found busy at any designated period of time, a plurality of connecting paths from said second-named relay means to said plurality of counting means, each of said counting means being connected to one of said paths, switching means operable by said group of relay means to selectively establish a particular path of said plurality of paths from said second-named relay means to a selected one of said counting means that represents the number of units busy at the instant time said pulse generating means effected the operation of said first-named relay means, the selection of said particular path being dependent upon the number of relays of said group of relay means operated by said means operable by said first-named relay means when operated, said selected one of said counting means being operated by said second-named relay means over said selectively established particular path, and means including said pulse generating means for repeating the operation of said first-named relay means at predetermined intervals during said period of time to accumulate on each of said counting means the total number of times the number of units represented by each of said counting means were found busy at each repeated operation of said first-named relay means.

5. In apparatus for deriving data relevant to the average occupancy of a plurality of units over a period of time, a plurality of units, a pulse generating means, a plurality of relay means, each of said relay means being associated with and connected to a selected one of said units, busy means in each of said units responsive to an operable condition thereat for enabling the relay means associated therewith, a control means, said control means being connected to said pulse generating means and responsive to each pulse therefrom for operating the enabled ones of said relay means, a plurality of counting means, a plurality of connecting paths between said control means and said plurality of counting means, each of said counting means being connected to one of said paths, a switching means, said switching means being controlled by said relay means for selecting a particular path of said plurality of paths, the selection of said particular path being dependent upon the number of said relay means operated by said control means in response to a pulse from said pulse generating means, means including said control means for operating over said selected particular path said counting means connected thereto to indicate the number of said units which are in an operable condition when said control means is operated in response to a pulse from said pulse generating means, and means including said pulse generating means for repeating the operation of said control means at predetermined intervals during said period of time to accumulate on each of said counting means the total number of times the number of units represented by each of said counting means were busy at the termination of each of said intervals.

6. In apparatus for deriving data relevant to the average occupancy of a plurality of units over an arbitrary period of time, a plurality of units, a pulse timing means, a pulsing means controlled by said pulse timing means, a plurality of relay means, each of said relay means corresponding to a selected one of said units and operated by the operation of said corresponding unit, a plurality of counting means, each of said counting means arranged to represent the number of units operable at any one instant of time, a plurality of electrical paths between said pulsing means and said plurality of counting means, switching means operated by said relay means to selectively establish a particular path of said plurality of paths from said pulsing means to a selected one of said counting means representative of the number of units currently operated, means controlled by said pulse timing means to operate said selected one of said counting means in response to the establishment of said particular path, and means including said pulse timing means for operating at predetermined intervals during said arbitrary period of time, the selected one of said counting means representative of the number of units operated at the end of each of said intervals.

7. In apparatus for deriving data relevant to the average occupancy of a plurality of units over an arbitrary period of time, a pulse timing means, a pulsing means controlled by said pulse timing means, a plurality of units, a plurality of relay means each individual to one of said units and each jointly operable in response to the operation of its associated unit and to the reception of a pulse from said pulsing means, a plurality of counting means, a plurality of paths from said pulsing to said plurality of counting means, selecting means operated by said plurality of relay means to selectively establish a particular operating path of said plurality of paths from said pulsing means to a selected one of said counting means that represents the number of units busy when said pulsing means operates, said selected one of said counting means being operated by said pulsing means over said selected particular path, and means including said pulse timing means for repeating at predetermined intervals during said arbitrary period of time the operation of said relay means associated with operated units to accumulate on each of said counting means the number of times the number of units represented by each of said counting means were in an operated condition at the end of each of said intervals during said arbitrary period of time.

References Cited in the file of this patent

UNITED STATES PATENTS

| Number | Name | Date |
|---|---|---|
| 2,207,715 | Bumstead | July 16, 1940 |
| 2,414,472 | Loughridge | Jan. 21, 1947 |
| 2,525,824 | Nagel | Oct. 17, 1950 |
| 2,528,394 | Sharpless et al. | Oct. 31, 1951 |